Mar. 20, 1923.
C. H. VEEDER.
VISOR FOR AUTOMOBILES.
FILED OCT. 8, 1921.
1,448,883.
2 SHEETS—SHEET 2.
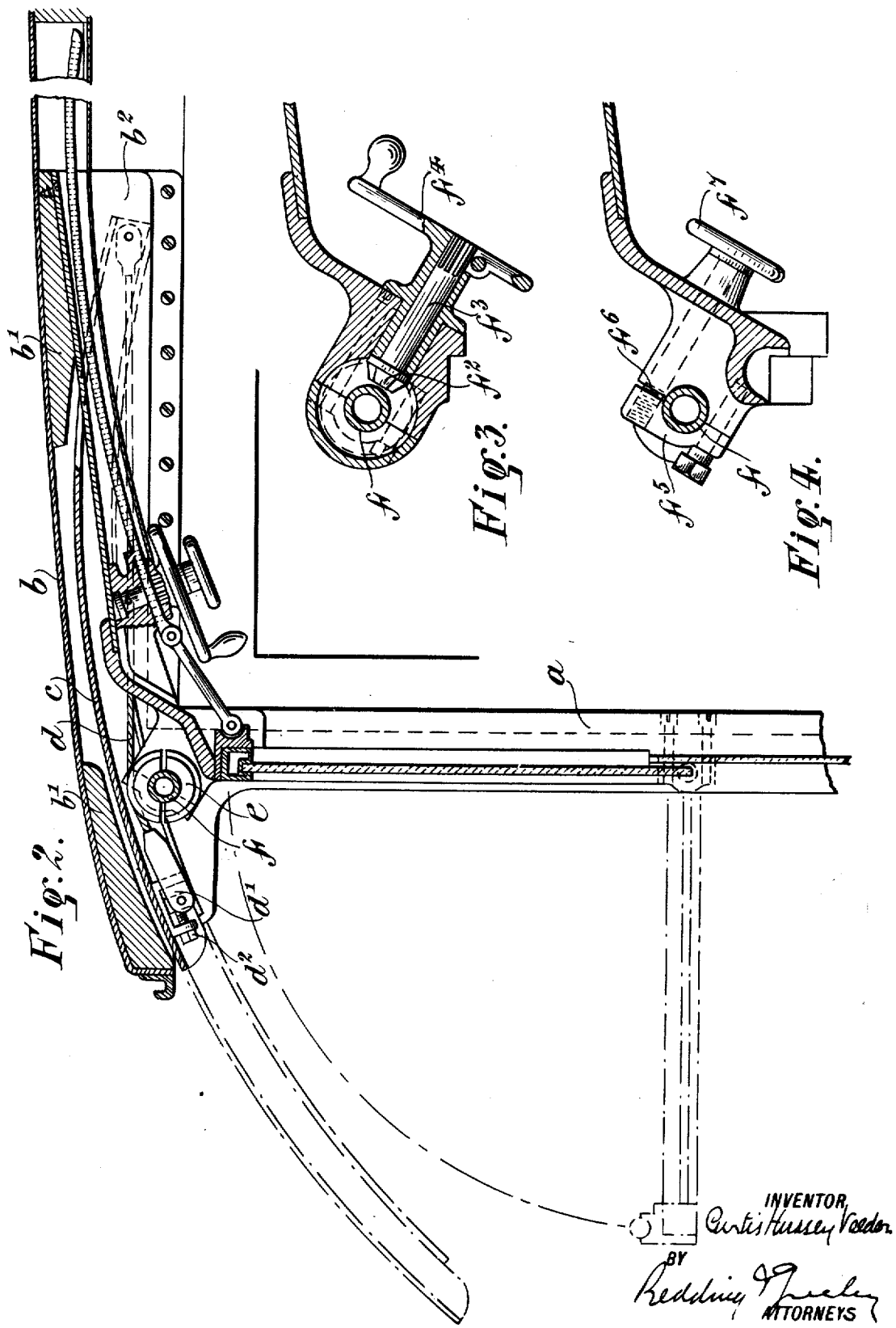

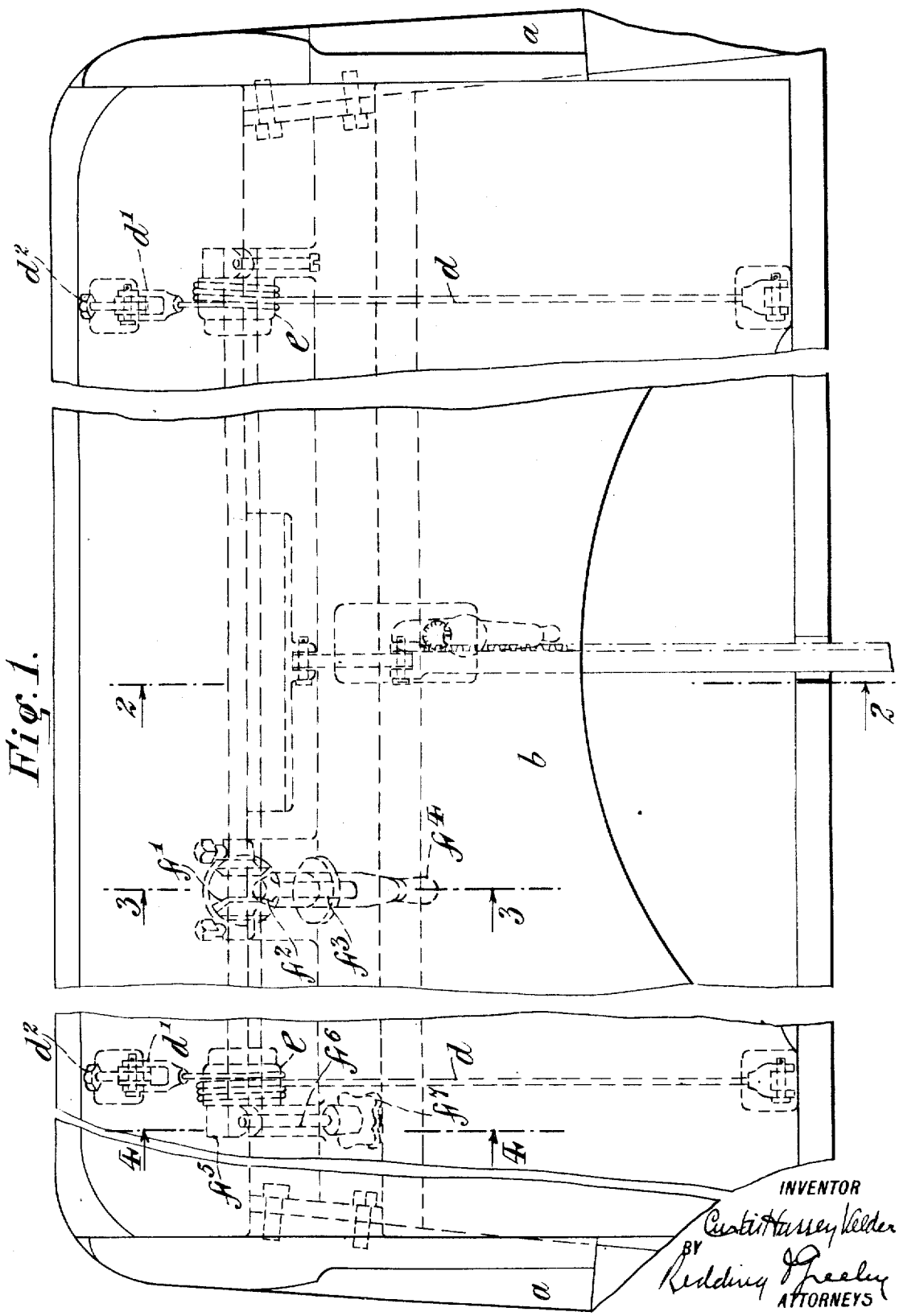

Patented Mar. 20, 1923.

1,448,883

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

VISOR FOR AUTOMOBILES.

Application filed October 8, 1921. Serial No. 506,287.

*To all whom it may concern:*

Be it known that I, CURTIS HUSSEY VEEDER, a citizen of the United States, residing in the city of Hartford, State of Connecticut, have invented certain new and useful Improvements in Visors for Automobiles, of which the following is a specification, reference being had to the accompanying drawings, forming a part hereof.

The use of visors, that is, of devices applied to automobiles, at or near the top of the wind shield, for the purpose of shielding the eyes of the driver from light, is increasing. In some cases such visors are fixed in position, in some cases they are made of inflexible material and are hung upon trunnions so that they can be swung to any desired angle, and in some cases they are made of flexible material and are folded or rolled out of the way when not desired and in use are held in extended position by suitable means. The object of this invention is to provide an improved visor which is particularly applicable to automobiles with fixed tops, is capable of being moved entirely out of the range of vision when not required, is readily manipulated from within the car, is not liable to stick or become jammed in movement and is not subject to rapid deterioration in use. The visor itself can be made of any suitable material, adapted for the purpose, and if made of metal, such as aluminum, or fibre board or glass, does not require a rigid carrying frame, such as would be required if it should be made of any flexible material, such as celluloid. When not in use the visor itself is retracted under the top and when required it is extended, to such extent as may be desirable, into proper position. Longitudinal guides are provided in the top, one at each side, and the operating means for the visor are such that the long, narrow visor is held in parallelism at all points of its movement so that it cannot assume an oblique position and bind in its guides. These operating devices will be fully explained hereinafter with reference to the accompanying drawings in which a suitable embodiment of the invention is illustrated and in which—

Figure 1 is a top view of the forward portion of the top of an automobile, partly broken out to save space and with the operating mechanism of the visor shown in broken lines.

Figure 2 is a view in section on the plane indicated by the broken line 2—2 of Figure 1.

Figures 3 and 4 are detail views in section on the planes indicated by the broken lines 3—3 and 4—4 of Figure 1.

In the embodiment of the invention illustrated in the drawings, the windshield frame $a$ and the top $b$ are shown as arranged substantially as usual in closed automobiles. The visor $c$, assumed to be of such material or so constructed as to retain its shape, is preferably, although not necessarily, curved so as to accommodate itself to the construction of the top and is arranged to move bodily from a position, when not in use, as indicated by full lines in Figure 2, under the forward portion of the top $b$, in a forward direction into a position to shield the eyes of the driver, as indicated by broken lines in Figure 2. The visor is necessarily long and narrow and, unless special means were provided to guide and move the visor, it would be liable in movement to assume a diagonal position and become jammed. To prevent this, longitudinal guides, indicated at $b'$, are provided in the fixed top $b$, in which the extremities of the long, narrow visor are received and guided. There is also formed immediately below the top $b$ a closed pocket, as at $b^2$, to receive the visor so that it shall not be visible from within the automobile and so that wind or rain cannot drive through from the visor opening into the interior of the body.

For the operation of the visor there are secured to it, at its front and rear edges, one at each side, cables $d$, preferably of bronze wire, each cable being secured to the visor, at least at one end, by an ordinary screw adjustable connection $d'$, so that by adjustment of the screws $d^2$ the proper tension can be placed on the cables. Each cable $d$ is passed through and around a drum $e$ which is clamped adjustably on a shaft $f$ mounted for rotation in suitable bearings supported by the frame. By rotary adjustment of one or both of the drums the visor can be squared in position with respect to the operating mechanism so that the visor shall be maintained always with its longitudinal axis at right angles to the direction of movement and in parallelism with the operating shaft. The shaft is also provided, at a convenient point, with a beveled pinion $f'$ which is engaged by a beveled pinion $f^2$ on a short shaft $f^3$ which is mounted in a suitable bearing and is provided with an operating handle $f^4$. One of the bearings, as $f^5$, of the shaft $f$, is split, as shown in Figure 4, and is provided with a clamping screw $f^6$ and hand-wheel $f^7$ so that the shaft can be secured readily in position of rotation and released when required.

In operation it will be understood that when the visor is in its retracted position and is required for use, the clamping bearing $f^5$ is released and the shaft $f$ is rotated by the hand-wheel $f^4$. By this action the cables $d$ move the visor $c$ forward into its desired position of operation, the shaft $f$ being again clamped when the visor has reached such position. When the visor is no longer required the shaft is again released and by a reverse rotation of the shaft the visor is moved back under the top out of the way. It will be observed that by the provision of an operating shaft mounted in fixed bearings in a position at right angles to the direction of movement of the visor, with a drum at each end of the shaft and a cable wound about each drum and having its ends connected to the front and rear edges of the visor at the corresponding end of the visor, the visor is maintained at all points of its movement with its longitudinal axis at right angles to the direction of movement, so that it cannot jam or bind.

It will be obvious that various changes in details of construction and arrangement will be made to suit different conditions of use and that the invention, except as pointed out in the claims, is not restricted to the precise construction shown and described herein:

I claim as my invention:

1. The combination with an automobile top and a supporting frame having guides at the longitudinal sides of the top, of a visor of relatively non-flexible material extending across the top and having its ends extending into and freely movable in said guides, an operating shaft mounted in bearings in the top immediately below the visor with its axis at right angles to the direction of movement of the visor and to said guides and provided at each end with an operating connection between it and the visor so arranged that upon rotation of the shaft the ends of the visor will be moved in parallelism, and means for rotating the shaft.

2. The combination with an automobile top and a supporting frame having guides at the longitudinal sides of the top, of a visor of relatively non-flexible material extending across the top and having its ends extending into and freely movable in said guides, an operating shaft mounted in bearings immediately below the visor with its axis at right angles to the direction of movement of the visor and provided at each end with a drum, a cable wound on each drum having its ends connected to the visor at its front and rear edges near its ends, the two cables being of the same length so that upon rotation of the shaft the ends of the visor will be moved in parallelism.

3. The combination with an automobile top and a supporting frame having guides at the longitudinal sides of the top, of a visor movable bodily in said guides, an operating shaft mounted in bearings with its axis at right angles to the direction of movement of the visor and to said guides, drums fixed upon the shaft, one at each end, cables wound upon the drums respectively and respectively having their ends connected to the visor at its front and rear edges near the ends thereof, a beveled gear fixed on the shaft and a second beveled gear in engagement with the first beveled gear, supported on the frame and having an operating handle.

This specification signed this 6th day of October A. D 1921.

CURTIS HUSSEY VEEDER.